US005291225A

United States Patent [19]

Saito

[11] Patent Number: 5,291,225

[45] Date of Patent: Mar. 1, 1994

[54] DEVICE FOR DETERMINING PAPER SIZE BASED ON TIME DATA

[75] Inventor: Akihiro Saito, Numazu, Japan

[73] Assignee: Tokyo Electric Co., Ltd., Tokyo, Japan

[21] Appl. No.: 710,673

[22] Filed: Jun. 5, 1991

[30] Foreign Application Priority Data

Jun. 13, 1990 [JP] Japan .................................. 2-152671

[51] Int. Cl.⁵ ...................... G01D 15/24; G01D 15/26; G01D 15/34

[52] U.S. Cl. .................................... 346/134; 250/560; 355/311; 355/316

[58] Field of Search ............... 355/203, 208, 309, 311, 355/316; 250/548, 560, 561; 271/258, 259; 346/134

[56] References Cited

U.S. PATENT DOCUMENTS 4,060,907 12/1977 Van Hook .......................... 250/561
4,552,065 11/1985 Billington et al. ............... 101/93.33
4,707,111 11/1987 Inuzuka et al. ...................... 355/311
4,763,164 8/1988 Ariga et al. ......................... 355/311
4,937,622 6/1990 Makiura .......................... 355/316 X

FOREIGN PATENT DOCUMENTS 0054346 6/1982 European Pat. Off. .
0300097 1/1989 European Pat. Off. .
0397124 11/1990 European Pat. Off. .
2742181 3/1978 Fed. Rep. of Germany .
0010270 1/1985 Japan .................................. 355/311
0059377 3/1986 Japan .................................. 355/311

OTHER PUBLICATIONS

IBM Technical Disclosure Bulletin, vol. 18, No. 2, Jul. 1975, pp. 330–331 Church et al, "Dynamic Sheet Length Sensing".

*Primary Examiner*—A. T. Grimley
*Assistant Examiner*—William J. Royer
*Attorney, Agent, or Firm*—Frishauf, Holtz, Goodman & Woodward

[57] ABSTRACT

A paper size determination device comprises a paper sensor for detecting paper passing a preset position on a feeding path and generating a detection signal, and a processing circuit for measuring the generation period of the detection signal supplied from the paper sensor and determining the paper size according to the generation period measured. The processing circuit of the determination device includes a step counter for measuring and holding time data on the generation period of the detection signal, in response to the detection signal generated from the paper sensor, a mode counter circuit for detecting that the step counter has completed the measurement and generating a measurement completed mode, and a data processor for detecting that the measurement completed mode has been set and determining the paper size according to the time data held by said step counter.

13 Claims, 5 Drawing Sheets

DEVICE FOR DETERMINING PAPER SIZE BASED ON TIME DATA

BACKGROUND OF THE INVENTION

1. Field of the Invention

The present invention relates to a paper size determination device for determining the size of a sheet of paper which is actually loaded in a printing operation, for example, and more particularly to a paper size determination device for determining the size of a sheet of paper by measuring the length of time required for the paper to pass a preset position on a paper feeding path.

2. Description of the Related Art

A laser printer or a copying machine are well known examples of an electrophotographic printing device. A typical electrophotographic printing device includes a photosensitive drum serving as an image carrier, and further includes processing sections disposed around the photosensitive drum, for effecting the charging, exposing, developing, charge transferring, cleaning, and discharging operations. The photosensitive drum is rotated during the printing operation and sequentially subjected to the processes performed by the above processing sections. The charging section uniformly charges the surface of the photosensitive drum, the exposing section selectively exposes the surface to create an electrostatic latent image corresponding to image data, the developing section supplies toner to be affixed to that portion of the surface which corresponds to the electrostatic latent image, so as to convert the electrostatic latent image to a visual image, and the charge transferring section charges a sheet of paper from a paper supplying cassette and set in the charge transferring position so as to transfer the toner image on the drum to the paper. Thereafter, the paper is discharged to the exterior via a fixing section for fixing the toner image on the paper. Then, the cleaning section removes toner remaining on the drum and the discharging section removes any charges remaining thereon.

The above electrophotographic printing device is constructed such that it determines the size of a sheet of paper actually loaded on the charge transferring section during a normal printing operation. Specifically, a paper sensor is provided for detecting a sheet of paper passing a preset position on the paper feeding path, and the paper detection period is measured by a microprocessor which is used to control the entire printing operation. In order to measure the paper detection period, the microprocessor repeatedly checks the paper sensor, operates an internal timer after the paper is detected until the absence of the paper is detected by the paper sensor, and determines the paper size based on the length of the paper, which is obtained by multiplying time data derived from the timer by the paper feeding speed. For example, if a printing operation is started without it being known that the loaded paper supplying cassette does not contain sheets of paper of correct size, unwanted paper is supplied to the paper feeding path from the paper supplying cassette, at which time it is determined that the length of the paper does not correspond to the correct paper size. Consequently, it is necessary to replace the paper supplying cassette before the next printing operation is started. The microprocessor sequentially controls the processing sections to create a toner image on the photosensitive drum, for example, in addition to checking the paper sensor. Therefore, the microprocessor must rapidly process various data necessary for each control operation so as to operate the processing sections at the proper timings. However, if the microprocessor has to check the paper sensor frequently in order to determine that the paper length is correct, this may delay the data processing operation. In order to prevent this problem from occurring, time allocation for the respective tasks must be set precisely, thus making it more difficult to create the required microprocessor program.

The conventional device uses a microprocessor having a relatively high processing ability so as to easily cope with future modifications made by software developing engineers. However, the cost of such a microprocessor including the peripheral circuits is quite high, making it difficult to manufacture the conventional device at a relatively low cost.

SUMMARY OF THE INVENTION

An object of the present invention is to provide a paper size determination device which reduces the workload of the data processor used for determining paper size.

The above object can be attained by a paper size determination device comprising a paper sensor for detecting paper passing a preset position on a feeding path and generating a detection signal, a measuring section for measuring and holding time data on the period of the detection signal in response to the detection signal generated from the paper sensor, and a data processor for determining the paper size according to the time data held by the measuring section.

In the above paper size determination device, the detection signal is generated from the paper sensor for the period during which the paper passes the preset position on the feeding path. The generation period of the detection signal is measured and time data thereon is held by the measuring section which is operated in response to the detection signal. The data processor determines the paper size according to the time data obtained. Since the data processor does not have to check the paper sensor repeatedly, its workload is reduced. Therefore, the data processor is not required to have a high processing ability and has more time for performing other tasks.

Additional objects and advantages of the invention will be set forth in the description which follows and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A laser printer according to an embodiment of the present invention will now be described with reference to FIGS. 1 to 5.

Figure 1:
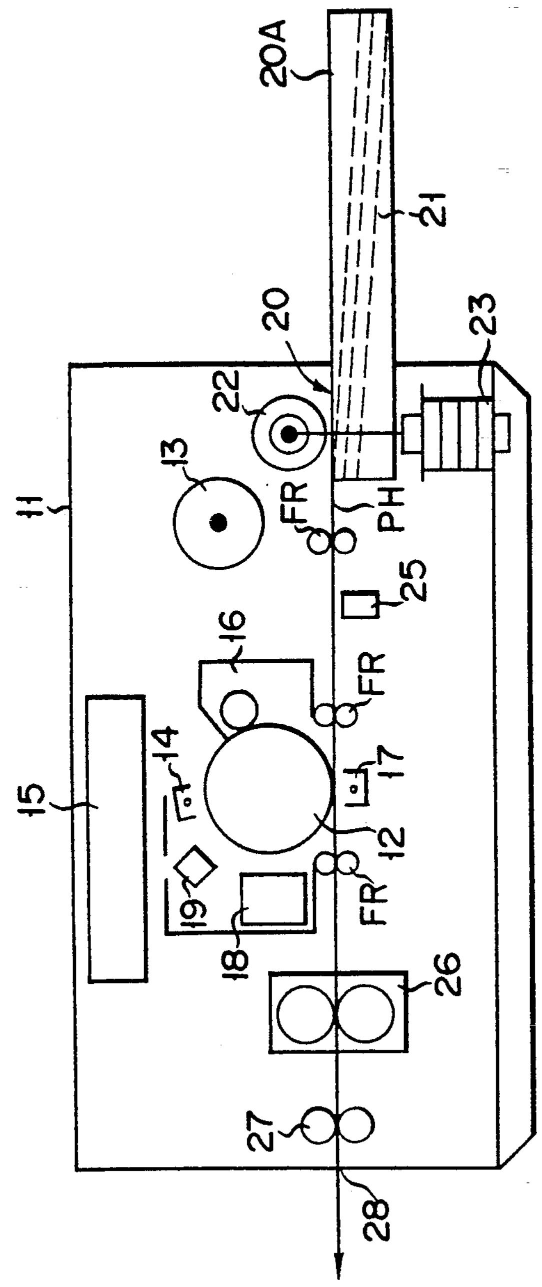
FIG. 1 is a diagram showing the internal structure of a laser printer according to an embodiment of the present invention.

FIG. 1 shows the internal structure of a laser printer. The laser printer includes a photosensitive drum 12 disposed in a housing 11, having a surface portion of a photoconductive material and serving as an image carrier, and further includes a charging section 14, exposing section 15, developing section 16, charge transferring section 17, cleaning section 18 and discharging section 19 which are disposed around the photosensitive drum 12 as processing sections for effecting the electrophotographic printing operation. The photosensitive drum 12 is connected to a feed motor 13 constructed by a stepping motor. In the printing operation, the photosensitive drum 12 is rotated in a clockwise direction by means of the feed motor 13 and is subsequently subjected to various processes by the above processing sections 14, 15, 16, 17, 18 and 19. The charging section 14 uniformly charges the surface of the photosensitive drum and the exposing section 15 is constructed by a laser scanner for selectively exposing the surface of the photosensitive drum 12 to create an electrostatic latent image corresponding to image data. The laser scanner selectively exposes the surface of the photosensitive drum by use of a laser beam emitted according to the image data. The developing section 16 supplies developing powder attached to portions of photosensitive drum surface which correspond to the thus created electrostatic latent image to make the electrostatic latent image visible, that is, toner to the photosensitive drum 12. The charge transferring section 17 charges a sheet of paper 21 supplied from a paper supplying cassette 20A which is detachably mounted on a paper supplying section 20 so as to transfer the toner image on the photosensitive drum 12 to the paper 21. The cleaning section 18 removes toner remaining on the photosensitive drum 12, and the discharging section 19 removes any charges remaining thereon.

The laser printer includes a pick-up roller 22, feeding rollers FR and discharging rollers 27 which are driven by means of the feed motor 13 so as to feed the paper 21 along a feeding path PH between the paper cassette 20A mounted on the paper supplying section 20 and a discharging port 28. The pick-up roller 22 is mounted so as to move from a home position set above the paper supplying section 20 and is set in contact with the paper received in the paper supplying cassette 20A by means of a paper supplying solenoid 23 which is operated for a preset period of time when the photosensitive drum 12 has reached a preset rotation angle position. The paper 21 is taken out from the paper supplying cassette 20A by the pick-up roller 22 and fed to the feeding pat PH. The feeding rollers FR feed the paper 21 thus supplied from the paper supplying cassette 20A to the discharging rollers 27 via the charge transferring section 17 and fixing section 26. The toner image is transferred from the photosensitive drum 12 to the paper 21 in the transferring position of the transferring section 17 and is fixed on the paper by a heating rollers of the fixing section 26. The discharging rollers 27 discharge the paper 21 fed from the fixing section 2 to the exterior via the discharging port 28.

Further, the laser printer includes a paper sensor 25 disposed at a preset position between the transferring section 17 and the paper supplying section 20, for optically detecting the paper 21 passing the above preset position. The paper sensor 25 generates an output signal according to whether or not the paper 21 is passing the preset position. That is, when the paper sensor 25 detects the paper 21, an output signal of the paper sensor 25 is set to a level different from that set when the paper 21 is not detected.

Figure 2:
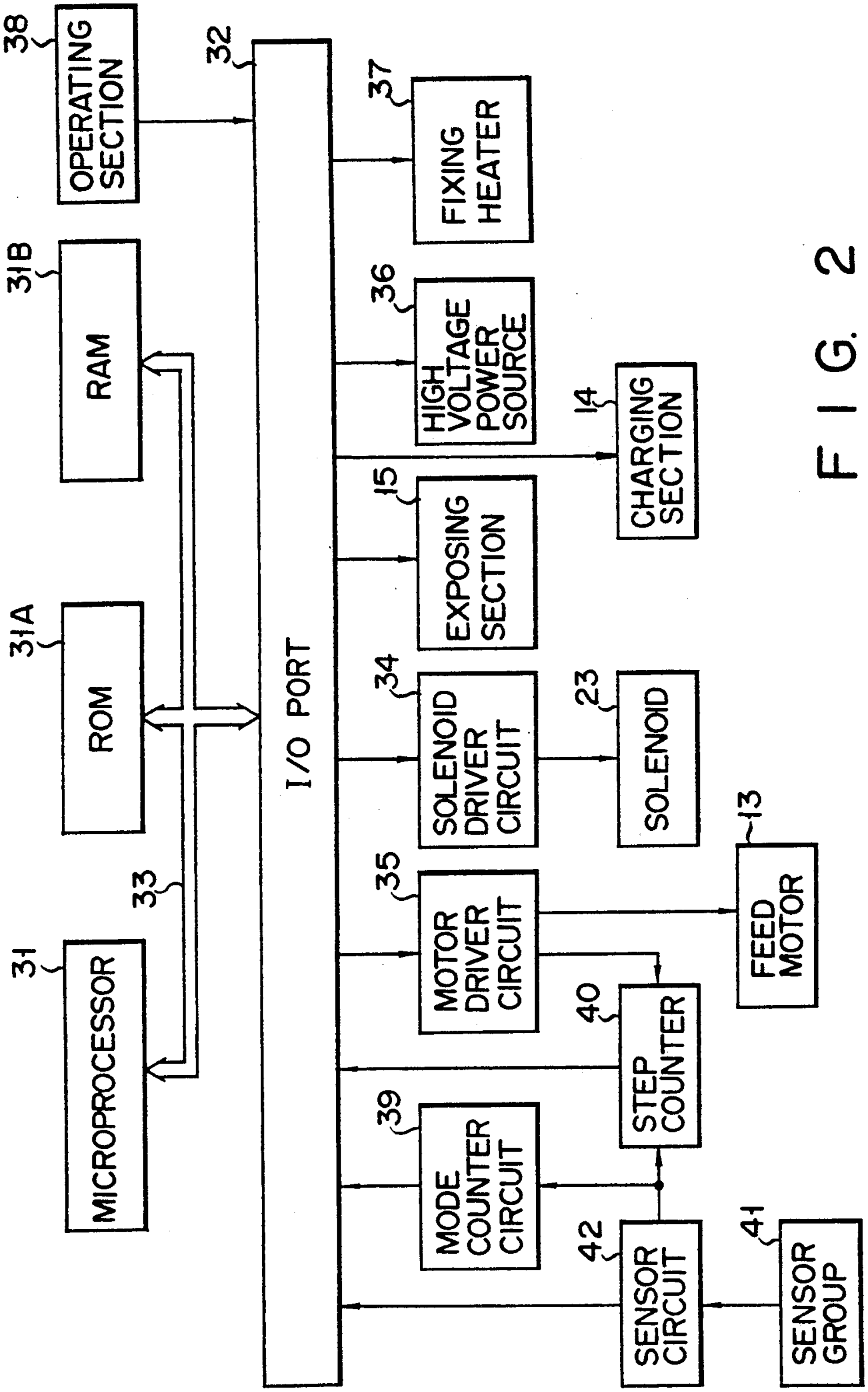
FIG. 2 is a block diagram showing a control circuit of the laser printer shown in FIG. 1.

FIG. 2 shows a control circuit of the laser printer. The control circuit includes a microprocessor 31 for generally controlling the operation of the laser printer, a ROM 31A for storing fixed data such as the control program of the microprocessor 31 and the feeding speed of the paper 21, a RAM 31B for storing variable data such a image data created for printing operation and a printing inhibition flag set for inhibiting the next printing operation, and an I/O port 32 for permitting data to be transferred between portions to be described later and the microprocessor 31. The microprocessor 31, ROM 31A, RAM 31B and I/O port 32 are connected to each other via a bus line 33. The I/O port 32 is connected to a solenoid driver circuit 34, motor driver circuit 35, exposing section 15, charging section 14, high voltage power source 36, fixing heater 37, operating section 38, mode counter circuit 39, step counter 40, and sensor circuit 42. The paper supplying solenoid 23 is driven by the solenoid driver circuit 34 and the feed motor 13 is driven by the motor driver circuit 35. The transferring section 17 is supplied with a high voltage necessary for the transferring operation from the high voltage power source 36. The operating section 38 includes various operation keys such as a start key, a printing number setting key and a paper size specifying key and a display. The sensor circuit 42 is used to control a sensor group 41 including the paper sensor 25.

Figure 3:
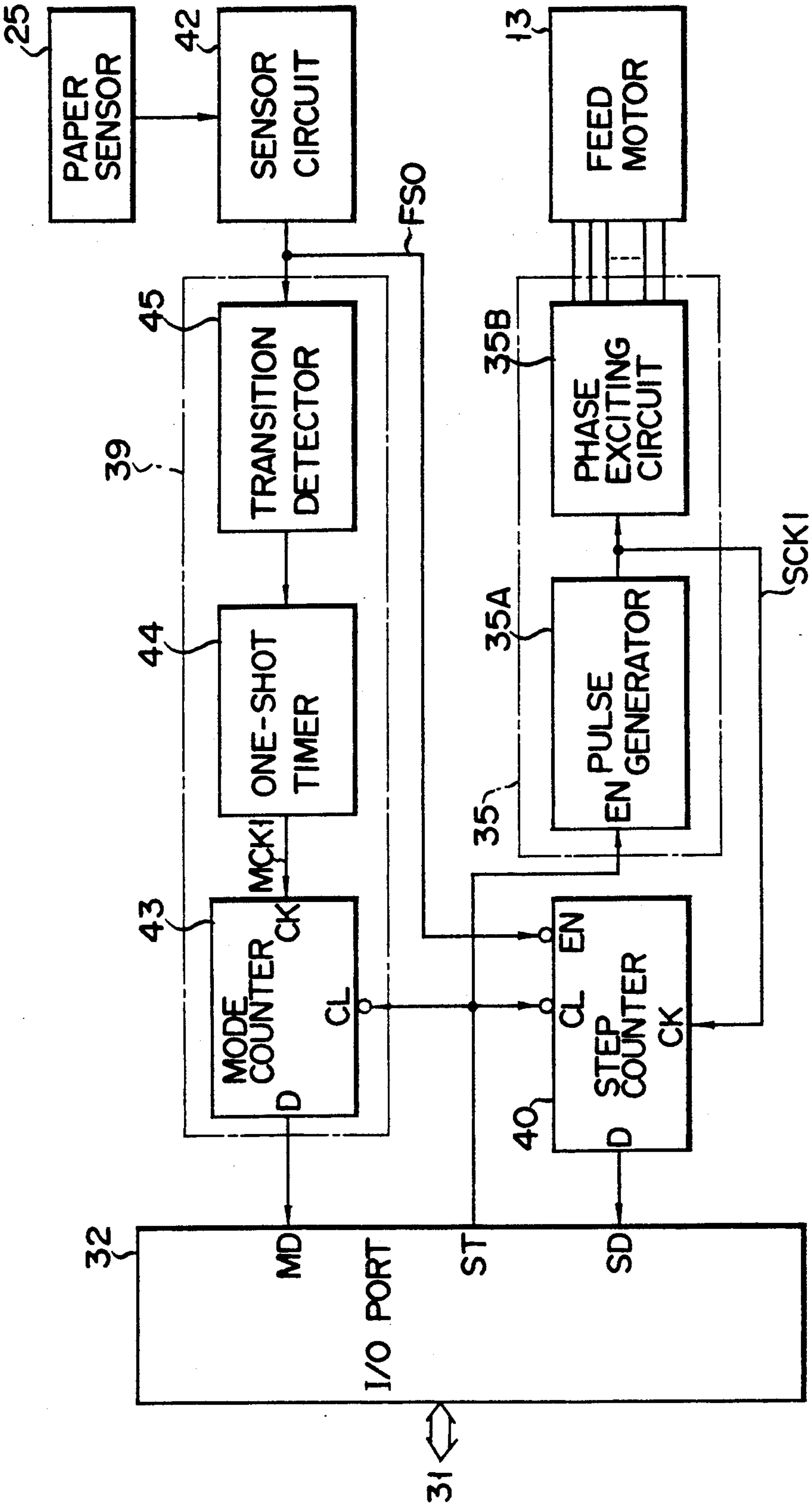
FIG. 3 is a diagram showing more in detail part of the control circuit shown in FIG. 2.
Figure 4:
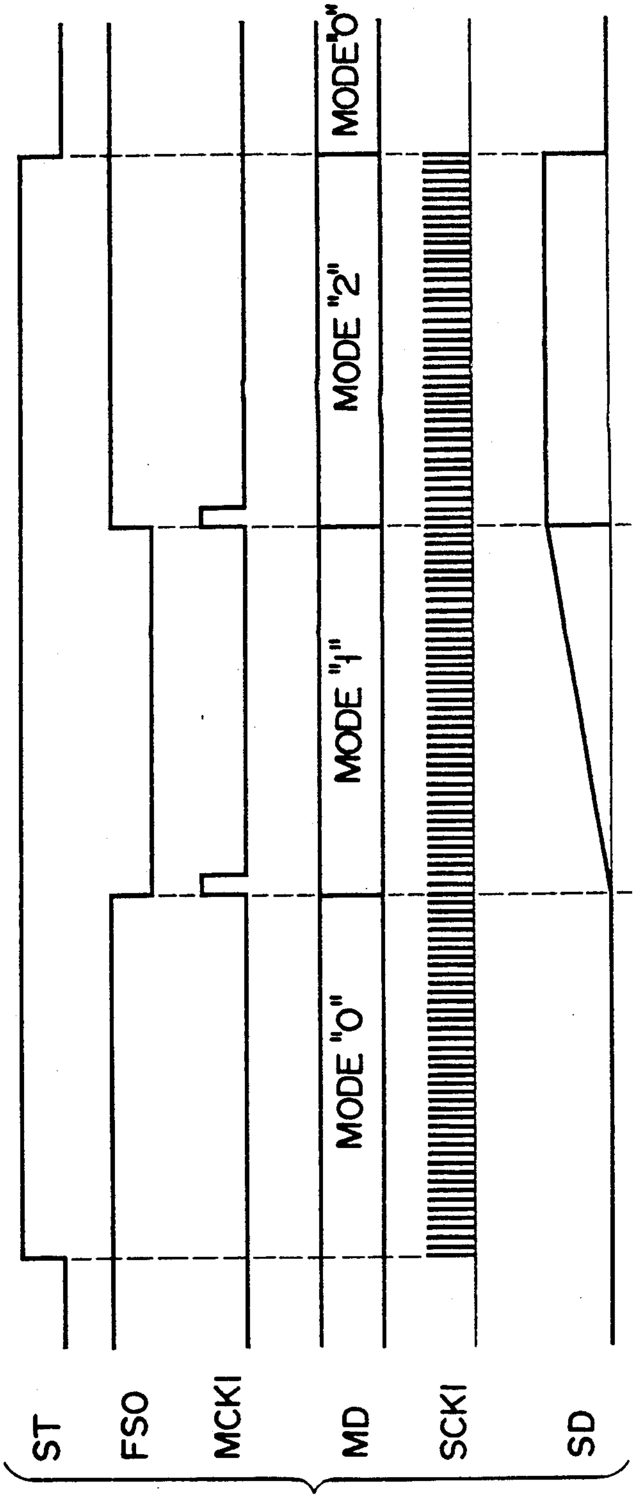
FIG. 4 is a timing chart explaining the operation of the circuit shown in FIG. 3.

FIG. 3 shows a paper size determination section of the control circuit shown in FIG. 2 in more detail, and FIG. 4 shows a timing chart of signals processed in the paper size determination section. The motor driver circuit 35 includes a clock pulse generator 35A for sequentially generating clock pulses SCKI by control of a motor control signal ST supplied via the I/O port 32 and a phase excitation circuit 35B for rotating the feed motor 13 by one-step angle in response to each clock pulse SCKl supplied from the clock pulse generator 35A. The motor control signal ST rises when start of rotation of the feed motor 13 is instructed and falls when interruption of rotation of the feed motor 13 is instructed. The clock pulse generator 35A generates a clock pulse SCKl in response to the rise of the motor control signal ST and interrupts generation of the clock pulse SCKl in response to the fall of the signal ST. The interval of the clock pulses SCKl is kept constant in a period except short periods immediately after the starting operation and immediately before the stop operation of the feed motor 13. Therefore, the paper 21 can be fed at a constant speed determined by the interval of the clock pulses SCK1 at least in a period in which the paper passes through the preset position set on the feed path PH. The interval of the clock pulses SCK1 is varied by the slow-up and slow-down control operations well known in the art and respectively effected immediately after the starting operation and immediately before the stop operation of the feed motor 13.

The mode counter circuit 39 includes a mode counter 43, a one-shot timer 44 and a transition detector 45. The sensor circuit 42 generates an output signal FSO according to an output signal supplied from the paper sensor 25. The output signal FSO is kept at an "H" level while the paper 21 is not detected and kept at an "L" level while the paper 21 is being detected. The transition detector 45 detects the rise and fall of the output signal FSO supplied from the sensor circuit 42 and the one-shot timer 44 generates a pulse having a preset pulse width each time the transition detector 45 detects either the rise or the fall of the output signal FSO and supplies the pulse as an output signal MCK1 to the mode counter 43. The mode counter 43 counts the pulse of the output signal MCK1 and is reset to a count "0" in response to the fall of the motor control signal ST supplied via the I/O port 32. At the time of starting operation of the feed motor 13, the count of the mode counter 43 is at "0". The count is increased to "1" when the paper sensor 25 detects the paper 21 fed to the preset position and is kept at the value while the paper 21 is passing through the preset position. The count is further increased to "2" when the paper sensor 25 detects that the paper 21 has passed the preset position and is reset to "0" when the feed motor 13 is stopped. Thus, the mode counter 43 always holds a count "0", "1" or "2" and supplies a mode data MD specifying the mode "0", mode "1" or mode "2" to the I/O port 32 according to the count held therein.

Each clock pulse SCKl is also supplied from the clock pulse generator 35A to the step counter 40. The step counter 40 counts the clock pulse SCKl for a period of time from the fall to the rise of the signal FSO supplied from the sensor circuit 42 and supplies the counted value as data SD to the I/O port 32. When the counting operation of the step counter 40 is completed, the count set therein indicates the elapsed time of the paper 21 which varies depending on the length of the paper 21 and the count is kept held until the step counter 40 is reset in response to the fall of the motor control signal ST. Therefore, the microprocessor 31 causes the motor control signal S to fall after it has used the count.

Next, the operation of the above laser printer is schematically explained. When the start key of the operating section 38 is operated to permit the printing operation, the microprocessor 31 starts the control operation for the charging section 14, exposing section 15, developing section 16, transferring section 17, cleaning section 18, discharging section 19, fixing section 26 and the like.

The photosensitive drum 12 is rotated by means of the feed motor 13 and the respective processing sections are controlled according to the rotation angles of the photosensitive drum 12. The charging section 14 uniformly charges the surface of the photosensitive drum, the exposing section 15 selectively exposes the surface of the photosensitive drum to create an electrostatic latent image corresponding to image data, the developing section 16 supplies toner to the photosensitive drum 12 to attach the toner to that portion of the surface of the photosensitive drum 12 which corresponds to the electrostatic latent image so as to make the electrostatic latent image visible, and the charge transferring section 17 charges a sheet of paper 21 supplied from the paper supplying cassette 20A and set in the charge transferring position so as to transfer the toner image on the photosensitive drum 12 to the paper 21. The cleaning section 18 removes toner remaining on the photosensitive drum 12 and the discharging section 19 removes remaining charges on the photosensitive drum 12. After the charge transferring operation, the paper 21 is discharged to the exterior via the fixing section 26 for fixing the toner image on the paper.

In the starting operation of the feed motor 13, the microprocessor 31 sets the motor control signal ST to an "H" level after confirming that the mode data MD indicates the mode "0" and the print inhibition flag is reset. As a result, the clock pulse generator 35A generates the clock pulses SCKl and the phase exciting circuit 35B rotates the feed motor 13. At this time, the feed motor 13 rotates the pick-up roller 22, feed rollers FR and discharging rollers 27 as well as the photosensitive drum 12.

Further, the microprocessor 31 operates the paper supplying solenoid 23 for a preset period of time when the photosensitive drum 12 has reached a preset rotation angle position, thereby setting the pick-up roller 22 into contact with the paper 21. The paper 21 is supplied from the paper supplying cassette 20A to the feed path PH and is then fed towards the transferring section 17 by means of the feeding rollers FR.

When the front end of the paper 21 has reached the preset position on the feeding path PH and the paper detector 25 detects the presence of the paper 21, the output signal FSO of the sensor circuit 42 is changed from the "H" level to the "L" level and the step counter 40 starts to count the clock pulses SCKI supplied from the clock pulse generator 35A. The fall of the signal FSO is detected by the transition detector 45 and one pulse is generated from the one-shot timer 44 in response to the detection signal from the transition detector 45. The mode counter 43 counts the pulse to supply mode data MD indicating the mode "1" to the I/O port 32.

When the rear end of the paper has passed the preset position on the feeding path PH and the absence of the paper is detected by the paper sensor 25, the output signal FSO of the sensor circuit 42 is changed from the "L" level to the "H" level and the counting operation of the step counter 40 for counting the clock pulses SCKl supplied from the clock pulse generator 35A is interrupted. On the other hand, the rise of the signal FSO is detected by the transition detector 4 and one pulse is generated from the one-shot timer 44 in response to the detection signal from the transition detector 45. The mode counter 43 counts the pulse to supply mode data MD indicating the mode "2" to the I/O port 32.

Figure 5:
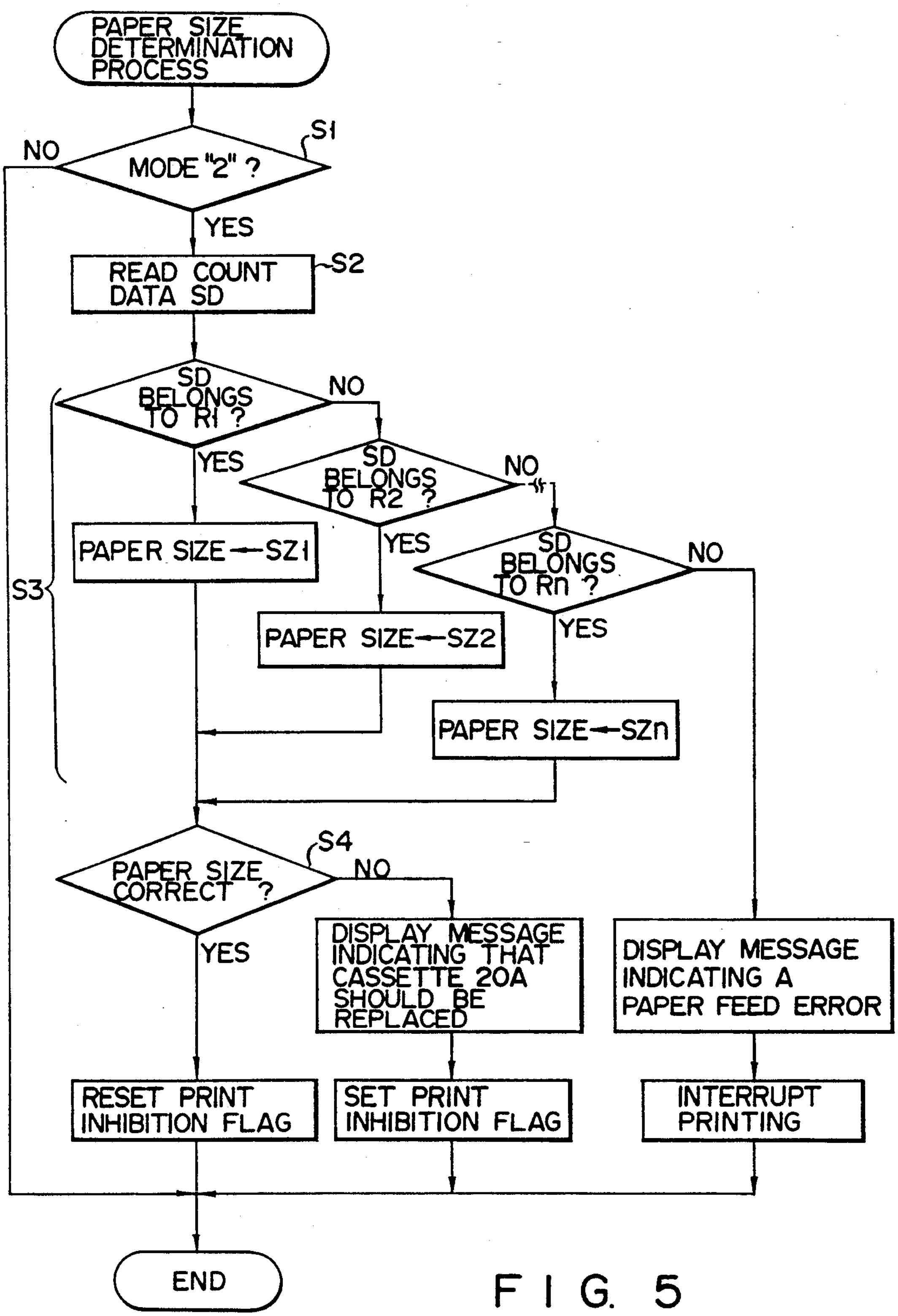
FIG. 5 is a flowchart explaining the paper size determination operation of the control circuit shown in FIG. 2.

The microprocessor 31 effects the paper size determination process shown in FIG. 5 between the control operations for creating a toner image on the photosensitive drum 12. In the paper size determination process, it is checked in the step S1 whether or not the mode "2" is set by the mode data MD. When the mode "2" is not set, the paper size determination process is ended. When it is detected that the mode "2" is set, the count data SD of the step counter 40 is read in the step S2. It is checked in the step S3 if the count data SD belongs to one of the counting ranges Rl to Rn which are determined according to the paper sizes SZl to SZn used by the laser printer. In a case where the counting range to which the data SD belongs is detected, the size of the paper 21 is determined to be the paper size corresponding to the detected counting range and it is checked in the step S4 whether or not the thus determined paper size coincides with the paper size previously specified by the paper size specifying key. When the paper sizes do not coincide with each other, a message indicating that the paper cassette 20A should be replaced is displayed on the display of the operating section 3 and the print inhibition flag is set to inhibit the next printing operation, and then the paper size determination process is ended. On the other hand, when the paper sizes coincide with each other, a message indicating that the paper cassette 20A should be replaced is not displayed on the display of the operating section 38 and the print inhibition flag is reset, and then the paper size determination process is ended.

When the count range to which the data SD belongs is not detected in the step S3, "paper feeding error" is displayed on the display of the operating section 38, the printing operation is interrupted, and then the paper size determination process is ended.

As described above, in the above embodiment, the paper sensor 25 detects the presence of the paper 21 passing the preset position on the feeding path PH and the sensor circuit 42 permits the step counter 40 to count the clock pulses SCKI for the detection period. That is, the step counter 40 effects the counting operation without being subjected to the direct control of the microprocessor 31. For this reason, the microprocessor 31 can effect the paper size determination process shown in FIG. 5 between the control processes for creating a toner image on the photosensitive drum 12. Thus, the task of the microprocessor 31 can be reduced so that time allocation for the respective tasks can be easily attained and the control program can be easily made, thereby making it unnecessary to use a microprocessor having a high processing ability. For example, even if a 4-bit microprocessor is used instead of the conventional 8-bit microprocessor required for attaining the high-speed operation, a printing operation can be effected at a high speed.

Further, in the above embodiment, the step counter 40 counts the clock pulses SCK generated from the clock pulse generator 35A provided for driving the feed motor 13, but it is also possible to count clock pulses generated from a clock pulse generator which is provided separately from the clock pulse generator 35A.

In addition, when a plurality of paper sensors are disposed along the feeding path PH in order to detect a paper jam, the paper sensor 25 may be constructed by use of one of the paper sensors.

Further, the mode data MD can be used for a process other than the paper size determination process. For example, the mode data MD specifying the mode "1" can be used to determine the period during which developing voltage is supplied to the developing section 16 so as to charge toner to be attached to the photosensitive drum 12.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A paper size determination apparatus for an electrophotographic printer having a data processing section which controls printing of an image on paper fed along a feeding path, said paper size determination apparatus comprising:

paper sensing means for sensing an absence of paper condition and a presence of paper condition at a present position on the feeding path;

measuring means for measuring a period of time during which the presence of paper condition is sensed by said paper sensing means;

mode setting means for sequentially setting first, second, and third modes, and first mode being set at an operation start condition, said second mode being set when the presence of paper condition is sensed by said paper sensing means as the mode setting means is in said first mode, and said third mode being set when said absence of paper condition is sensed by said paper sensing means as the mode setting means is in said second mode; and data processor means for determining, when said third mode is set during control of printing by the data processing section, a paper size according to the period of time measured by said measuring means.

2. A paper size determination apparatus according to claim 1, wherein said data processor means is incorporated in the data processing section of the electrophotographic printer.

3. A paper size determination apparatus according to claim 1, wherein said paper sensing means includes signal means for producing an output signal which is set to first and second levels according to the absence and presence of paper conditions, respectively.

4. A paper size determination apparatus according to claim 3, wherein said measuring means includes first pulse generating means for generating a clock pulse at predetermined intervals, and first counter means for counting the number of clock pulses generated by said first pulse generating means while the output signal of said signal means is set at said second level.

5. A paper size determination apparatus according to claim 4, wherein said mode setting means includes second pulse generating means for generating a pulse in response to each transition of the output signal of said signal means, and second counter means for counting the number of pulses generated by said second pulse generating means.

6. A paper size determination apparatus according to claim 5, wherein said data processor means includes confirming means for confirming, on the basis of the number of pulses counted by said second counter means, that said third mode is set, and wherein said data processor means determines a paper size when it is confirmed that said third mode is set.

7. A paper size determination apparatus according to claim 6, wherein said data processor means includes reset means for resetting said first counter means and said second counter means.

8. A paper size determination apparatus according to claim 4, wherein said data processor means includes reset means for resetting said first counter means.

9. A paper size determination apparatus according to claim 3, wherein said mode setting means includes pulse generating means for generating a pulse in response to each transition of the output signal of said signal means, and counter means for counting the number of pulses generated by said pulse generating means.

10. A paper size determination apparatus according to claim 9, wherein said data processor means includes confirming means for confirming, on the basis of the number of pulses counted by said counter means, that said third mode is set.

11. A paper size determination apparatus according to claim 10, wherein said data processor means includes reset means for resetting said counter means.

12. An electrophotographic printing apparatus, comprising:

a feeding path;

feeding means for feeding paper along said feeding path;

an image carrier;

image forming means for creating an electrostatic latent image on said image carrier, developing the latent image and transferring the developed image to the paper on said feeding path;

motor means for driving said feeding means;

paper sensing means for sensing an absence of paper condition and a presence of paper condition at a preset position on said feeding path;

pulse generating means for generating a clock pulse at predetermined intervals to drive said motor means;

counter means for counting a number of pulses generated by said pulse generating means while the presence of paper condition is sensed by said paper sensing means;

mode setting means for sequentially setting first, second, and third modes, said first mode being set at an operation start condition, said second mode being set when the presence of paper condition is sensed by said paper sensing means as the mode setting means is in said first mode, and said third mode being set when said absence of paper condition is sensed by said paper sensing means as the mode setting means is in said second mode; and data processor means for controlling said image forming means and said motor means to print an image, and for determining, when said third mode is set during control of printing, a paper size according to the number of pulses counted by said counter means.

13. An electrophotographic printing apparatus according to claim 12, wherein said operation start condition upon which said first mode is set is actuation of said motor means.

* * * * *

UNITED STATES PATENT AND TRADEMARK OFFICE

CERTIFICATE OF CORRECTION

PATENT NO. : 5,291,225

DATED : March 1, 1994

INVENTOR(S) : SAITO, Akihiro

It is certified that error appears in the above-indentified patent and that said Letters Patent is hereby corrected as shown below:

On the title page item [56], insert: --4,440,487 4/1984 Miura...355/311--

Signed and Sealed this

Thirty-first Day of January, 1995

Attest:

Bruce Lehman

BRUCE LEHMAN

*Attesting Officer*

*Commissioner of Patents and Trademarks*